United States Patent
Hobbs

(10) Patent No.: US 9,268,442 B1
(45) Date of Patent: Feb. 23, 2016

(54) APPARATUS AND METHOD FOR RECEIVING INPUT

(71) Applicant: Google Inc., Mountain View, CA (US)

(72) Inventor: Nicholas Kenneth Hobbs, San Francisco, CA (US)

(73) Assignee: Google Inc., Mountain View, CA (US)

( * ) Notice: Subject to any disclaimer, the term of this patent is extended or adjusted under 35 U.S.C. 154(b) by 92 days.

(21) Appl. No.: 13/737,427

(22) Filed: Jan. 9, 2013

(51) Int. Cl.
G06F 3/041 (2006.01)
G06F 3/045 (2006.01)
G06F 5/00 (2006.01)
G06F 3/044 (2006.01)

(52) U.S. Cl.
CPC ..................... *G06F 3/044* (2013.01)

(58) Field of Classification Search
CPC ........................................ G06F 3/044
USPC ......................... 345/156, 173, 174
See application file for complete search history.

(56) References Cited

U.S. PATENT DOCUMENTS

| | | | | |
|---|---|---|---|---|
| 3,898,421 | A | * | 8/1975 | Suzumura ..................... 200/517 |
| 5,508,703 | A | * | 4/1996 | Okamura et al. ............. 341/176 |
| 5,850,213 | A | * | 12/1998 | Imai et al. .................... 428/1.55 |
| 5,912,612 | A | * | 6/1999 | DeVolpi .......................... 338/95 |
| 7,310,083 | B2 | * | 12/2007 | Hagiwara et al. ............. 345/156 |
| 8,237,593 | B2 | * | 8/2012 | Oh ................................. 341/22 |
| 2002/0110237 | A1 | * | 8/2002 | Krishnan ..................... 379/419 |
| 2005/0030292 | A1 | * | 2/2005 | Diederiks ..................... 345/173 |
| 2006/0017585 | A1 | * | 1/2006 | Lenneman ............. B60K 35/00 340/691.6 |
| 2006/0028454 | A1 | | 2/2006 | Branton et al. |
| 2007/0069914 | A1 | * | 3/2007 | Lenneman ............. B60K 35/00 340/691.6 |
| 2008/0122794 | A1 | | 5/2008 | Koiso |
| 2008/0211779 | A1 | * | 9/2008 | Pryor ................. G01C 21/3664 345/173 |
| 2008/0291169 | A1 | * | 11/2008 | Brenner et al. ............... 345/168 |
| 2008/0293274 | A1 | * | 11/2008 | Milan .................... H01R 27/00 439/171 |
| 2008/0303796 | A1 | * | 12/2008 | Fyke ............................ 345/173 |
| 2009/0085880 | A1 | | 4/2009 | Vitale et al. |
| 2009/0197059 | A1 | * | 8/2009 | Weber et al. .................. 428/201 |
| 2009/0237371 | A1 | | 9/2009 | Kim et al. |
| 2009/0319893 | A1 | | 12/2009 | Pihlaja |
| 2010/0103127 | A1 | | 4/2010 | Park et al. |
| 2010/0162109 | A1 | * | 6/2010 | Chatterjee et al. ............ 715/702 |
| 2011/0286676 | A1 | | 11/2011 | El Dokor |
| 2011/0316785 | A1 | | 12/2011 | Hidary |
| 2013/0009900 | A1 | | 1/2013 | Pryor |

FOREIGN PATENT DOCUMENTS

DE 102009052928 A1 5/2011

* cited by examiner

*Primary Examiner* — Temesh Ghebretinsae
*Assistant Examiner* — Benyam Ketema
(74) *Attorney, Agent, or Firm* — Lerner, David, Littenberg, Krumholz & Mentlik, LLP

(57) ABSTRACT

According to aspects of the disclosure, an input device may include a first adjustment region, a second adjustment region, a connector region, a function region, and a display region. In one example, a user may access a particular function by providing a gesture to the function region. The user may then continue the gesture from the function region to the connector region for a predetermined length along the connector region. Once a particular function is accessed, a user may control the parameters or settings associated with that particular function via one or both of the first adjustment region and second adjustment region. For example, a user may provide a gesture to either the first or second adjustment region in order to modify parameters associated with the function.

29 Claims, 4 Drawing Sheets

APPARATUS AND METHOD FOR RECEIVING INPUT

BACKGROUND

In certain conventional touchscreen devices, the touchscreens are generally intuitive in that the gestures of a user generally correspond to the associated function being performed. Additionally, touch screens provide direct visual feedback by changing the visual elements the user's gestures are interacting with on the screen. However, this requires a user to look at the touchscreen in order to correctly perform the gesture. In certain other user interfaces, the control input (for example a track pad, mouse, scroll wheel, joystick, etc.) may be located away from the display module. In this regard, the controls may be difficult to learn and may lack the correspondence provided in other conventional touchscreens.

BRIEF SUMMARY

One aspect of the disclosure provides a system, including a user input device including a first input surface configured to receive user input, the first input surface disposed on a first side of the input device; a second input surface configured to receive user input, the second input surface disposed on the first side of the input device; and a display device disposed adjacent a second side of the user input device, the display device being disposed at a first distance from the first input surface and at a second distance from the second input surface, with the first distance being different from the second distance.

In one example, the user input device is substantially transparent.

In one example, the user input device further includes a display surface disposed on the first side, the display surface being disposed a third distance from the display device, the third distance being between the first and second distance.

In one example, the user input device further includes a third input surface configured to receive user input, the third input surface disposed on the first side of the input device and being disposed at a distance from the display device equal to the second distance.

In one example, the third input surface further includes a plurality of third input surfaces.

In one example, the first input surface is circular.

In one example, the first input surface is convex with respect to the second side.

In one example, the first input surface is configured to receive at least one of a horizontal swipe, vertical swipe and tap.

In one example, the second input is a circular ring.

In one example, the second input surface surrounds the first input surface.

In one example, the second input is recessed with respect to the first side of the input device.

Another aspect of the disclosure provides a user input device having a first side and a second side, including a first input surface configured to receive user input, the first input surface disposed on the first side and having a first height with respect to the second side; a second input surface configured to receive user input, the second input surface disposed on the first side of the user input device and having a second height with respect to the second side; a substantially transparent display surface disposed on the first side of the input device configured to display a graphic, the display surface having a third height with respect to the second side that is less than the first height and greater than the second height.

In one example, the user input device further includes a third input surface configured to receive a third user input, the third input surface disposed on the first side of the input device and having a height with respect to the second side that is equal to the second input surface.

In one example, the third input surface further comprises a plurality of third input surfaces.

In one example, the first input surface is circular.

In one example, the first input surface is convex with respect to the second side.

In one example, the first input surface is configured to receive a horizontal swipe, vertical swipe or tap.

In one example, the second input is a circular ring.

In one example, the second input surface surrounds the first input surface.

In one example, the second input is recessed with respect to the first side of the input device.

Another aspect of the disclosure provides a method of receiving input, including receiving a first user input at a first input surface, the first input surface being disposed on a first side of a user input device and having a first height with respect to a second side of the user input device; and receiving a second user input at a second input surface, the second user input being disposed on the first side of the user input device and having a second height with respect to the second side of the user input device, the second height being different from the first height.

In one example, the first user input comprises at least one of a horizontal swipe, a vertical swipe, or a tap.

In one example, the second user input comprises a circular swipe.

Another aspect of the disclosure provides a system including: a display; a substantially transparent input device overlaying the display; the input device comprising a surface and an output, the output providing signals indicative of a location at which the surface was touched and the surface including: a first touch sensitive portion, a second touch sensitive portion disposed farther from the display than the first touch sensitive portion, and a transition portion disposed between the first touch sensitive portion and the second touch sensitive portion, the transition portion being configured to be perceptibly distinguishable, based on human touch, from the first and second touch sensitive portions.

In one example, the system may further include a processor, a memory accessible by the processor and instructions stored in the memory and accessible by the processor, wherein the instructions include: displaying on the display a first visual feature corresponding with a first function at a location corresponding with the first touch sensitive portion, displaying on the display a second visual feature corresponding with a different function at a location corresponding with the second touch sensitive portion, and performing the first function when the output indicates that the first touch sensitive portion was touched and the second function when the output indicates that the second touch sensitive portion was touched.

In one example, edges of the input device lie substantially within the same plane.

In one example, a shape of the transition portion relative to the plane is a curve.

In one example, the shape is a circle.

In one example, a cross section of the transition portion, relative to a plane orthogonal to the plane of the display edges, is at least partially curved.

In one example, the input device is configured to output data indicative of a swipe gesture, wherein the first touch sensitive portion is configured to receive a swipe gesture without touching the second touch sensitive portion, and wherein the second touch sensitive portion is configured to receive a swipe gesture without touching the first touch sensitive portion.

In one example, the transition portion is touch sensitive and the output indicates when the transition portion was touched.

DETAILED DESCRIPTION

Figure 1:
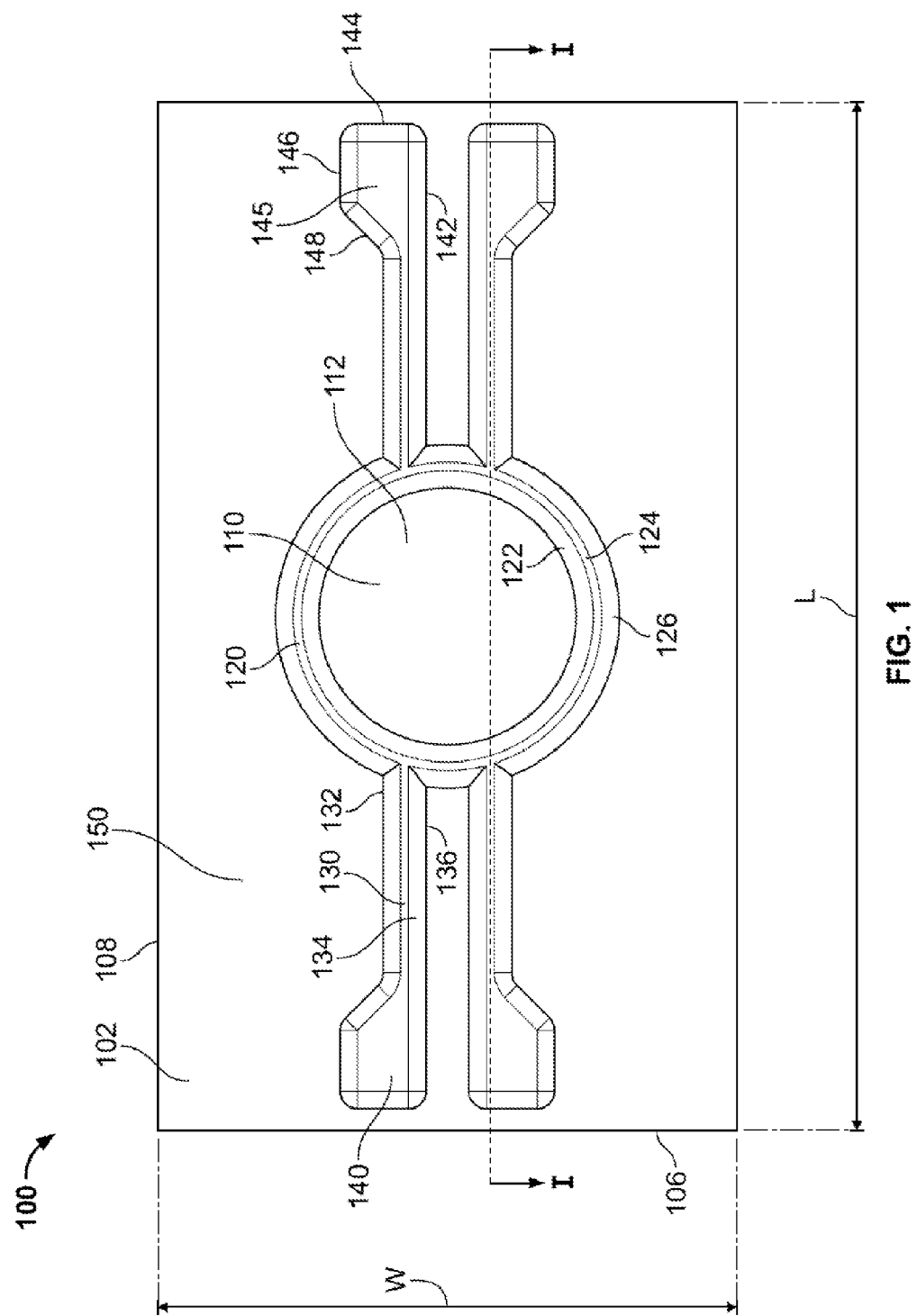
FIG. 1 is a top view of an input device according to one aspect of the disclosure.

According to aspects of the disclosure, an input device 100 may include a first adjustment region 110, a second adjustment region 120, a connector region 130, a function region 140, and a display region 150. In one example, a user may access a particular function by providing a gesture to the function region 140. The user may then continue the gesture from the function region 140 to the connector region 130 for a predetermined length along the connector region 130. Once a particular function is accessed, a user may control the parameters or settings associated with that particular function via one or both of the first adjustment region and second adjustment region. For example, a user may provide a gesture to either the first or second adjustment region in order to modify parameters associated with the function.

Figure 2:
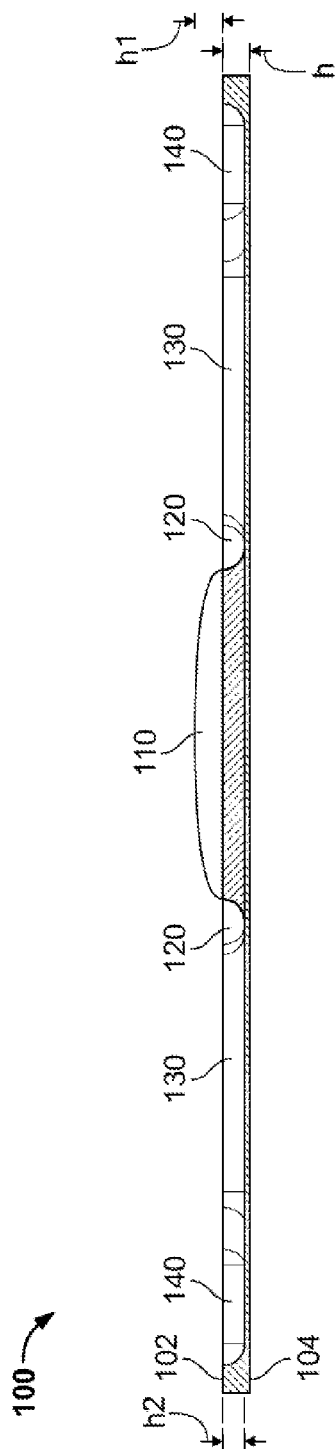
FIG. 2 is a cross-sectional view of the input device of FIG. 1 along the line I-I.

FIG. 1 is a top view of an input device according to one aspect of the disclosure, while FIG. 2 is a cross-sectional view of the input device of FIG. 1 along the line I-I. In the example of FIGS. 1 and 2, the input device 100 may be substantially parallelepiped in shape. In this regard, the input device 100 may include a top surface 102, a bottom surface 104, and sides 106 and 108. In other examples, the input device 100 may have a different shape. For example, the input device 100 may be substantially circular or any other three-dimensional shape, such as a polygon, oval, etc.

The device 100 may have any dimensions. In this example, the device 100 may have a length l along side 108 of approximately 8 inches, e.g., 8 inches +/−1 inch, a width w along side 106 of approximately 4 inches, e.g., 4 inches +/−1 inch, and a height h of approximately ½ inch, e.g., ½ inch +/−¼ inch. The height h may represent a height of an overall planar surface of the device 100, e.g., a height h as measured between a top surface 102 and a bottom surface 104 of the input device 100 at one of the sides 106, 108 of the device 100. However, certain regions of the device 100, such as regions formed at the top surface 102, may have a height greater or less than the height h, which will be explained in greater detail below.

The device 100 may be formed of any material, including, for example, one or more of plastic, glass, or any other materials capable of receiving tactile input. For example, the device 100 may be capable of detecting tactile inputs from a user, such as gestures in the form of taps, swipes, and the like. In this regard, the device 100, or portions thereof, may be any type of interface capable of detecting tactile input, such as a resistive, surface acoustic wave, or capacitive interface. In another example, the device 100 may be formed of a material not capable of receiving tactile input. In yet another example, the device may be capable of receiving tactile input at certain regions but not at others. In yet another example, the device 100 may be a composition or combination or multiple materials, such as any of the materials discussed above. According to one aspect of the disclosure, the device 100, or portions thereof, may be substantially transparent to allow a user to see therethrough.

The device 100 may include a first adjustment region 110. The first adjustment region 110 may be a generally circular or other shaped region and may be configured to receive an input from a user. In this regard, the first adjustment region 110, or at least a portion thereof, may be capable of receiving tactile input from a user at an input surface 112. The input from a user may be, for example, any type of tactile input, such as any type of gesture including a tap, swipe, or the like. The input surface 112 may be convexly curved with respect to the top surface 102 of the device 100. In this regard, as shown in FIG. 2, the surface 112 may extend above the top surface 102 by a height h1. The height h1 may be any height, and in one example may be approximately 0.5 cm, e.g., 0.5 cm +/−0.1 cm.

The device 100 may also include a second adjustment region 120 for receiving a second input. The second adjustment region 120 may surround the first adjustment region 110. In this regard, the second adjustment region 120 may be in the shape of a ring or any other shape which may be substantially concentric or otherwise surrounds, complements or follows the shape of the first adjustment region 110. The second adjustment region 120 may have an inner sidewall 122, an input surface 124, and an outer sidewall 126. The inner sidewall 122 may be a continuously formed wall that extends between the input surface 124 of the second adjustment region 120 and the input surface 112 of the first adjustment region 110. The inner sidewall 122 and the input surface 124 of the second adjustment region 120 may adjoin by way of a curved edge surface, or alternatively, at a predetermined angle. In the same way, the inner sidewall 122 and the input surface 112 of the first adjustment region 110 may adjoin by way of a curved edge surface, or alternatively, at a predetermined angle. In this regard, a transition between the input surface 124 of the second adjustment region and the input surface 112 of the first adjustment region may be perceptible to a human solely by touch, thereby allowing a human to distinguish between the input surfaces 112 and 124 based solely on touch.

The input surface 124 may have a continuously curved cross-section, as seen in the example FIG. 2, and may be configured to receive input from a user. The input surface 124 may be capable of receiving tactile input, such as a gesture including a tap, swipe, or the like. The surface 124 may also be concave with respect to the top surface 102 of the device 100. For example, the surface 124 may be a ring-shaped channel formed in the device 100. In this regard, the input surface 124 may extend a distance h2 below the top surface 102 device 100. The height h2 may be any height, and in one example is approximately 0.5 cm, e.g., 0.5 cm +/−0.1 cm.

The outer sidewall 126 may include a curved surface concentrically arranged with respect to the inner sidewall 122. The outer sidewall 126 may be discontinuously formed in the sense that the sidewall 126 may be interrupted by one or more connector regions 130, as will be explained in greater detail below. The sidewall 126 may extend from the input surface 124 to the top surface 102 and may join the two either by a curved surface or at predetermined angles.

Each of the first and second adjustment regions 110 and 120 may be sized and shaped to provide visual feedback to a user regarding a type of gesture input may be processed as an input command at the region. For example, a user may intuitively determine, based on the shape of the first and second adjustment regions 110 and 120, that the second adjustment region 120 may accept and process a circular swipe input, either with one finger or with multiple fingers. In another example, gesture input provided to one of the adjustment regions 110 and 120 may not be extended to result in an input at the other of the adjustment regions 110 and 120. This may be accomplished by virtue of the height differences between the two regions, or alternatively, by a processor connected to the input device 100, as will be described in greater detail below.

The device 100 may also include a connector region 130 and a function region 140. According to some aspects of the disclosure, the device 100 may include a plurality of connector sub-regions 130 and function sub-regions 140. In this example, each connector sub-region 130 may correspond to a respective function sub-region 140. It is contemplated that the device 100 may include any number of connector regions or sub-regions 130 and function regions or sub-regions 140.

The connector region 130 may include sidewalls 132 and 136 and an input surface 134. Each of the sidewalls 132, 136 may extend between the input surface 134 and the top surface 102 of the device 100. In this regard, the sidewalls 132, 136 may be curved surfaces or may adjoin the adjacent input surface 134 and top surface 102 at a predetermined angle. The sidewalls 132 and 136 may extend in a generally parallel fashion between the function region 140 and the second adjustment region 120. The input surface 134 may be capable of receiving tactile input from a user, such as a gesture including a tap, swipe, or the like. The input surface 134 has a generally curved cross section in a direction perpendicular to the sidewalls 132, 136.

In the example of FIG. 1, the function region 140 may include a plurality of sidewalls 142, 144, 146, 148 as well as an input surface 145. The sidewall 142 may be parallel to the sidewalls 132 and 136, and may extend between one of the sidewalls 132, 136 and the sidewall 144. Similarly, the sidewall 146 may be parallel to the sidewalls 132 and 136, and may extend between the sidewall 148 and sidewall 144. The sidewall 144 may be perpendicular to the sidewalls 142 and 146, while the sidewall 148 may be disposed at approximately a 45 degree angle with respect to the sidewall 146. Each of the sidewalls 142-148 may extend between the input surface 145 and the top surface 102, and may be curved or may form an angle with each. The input surface 145 may be substantially flat and may be capable of receiving tactile input from a user.

The first adjustment region 110, second adjustment region 120, connector region 130 and function region 140 may each have a shape that corresponds to one or more types of user inputs. For example, each of the regions 110-140 may include respective input surfaces that correspond to a particular type of gesture input. In this regard, input surface 112 may correspond to a left-to-right (horizontal) or up-to-down (vertical) swipe input gesture, or alternatively may correspond to a tap input gesture. Input surface 124 may correspond to a circular swipe input gesture. Input surfaces 134 may correspond to a linear swipe input gesture.

The device 100 may also include a display region 150. The display region 150 may correspond to a respective connector region 130 and function region 140. In this regard, the input device 100 may include a plurality of display sub-regions 150, each of which correspond to a respective connector sub-region 130 and a function sub-region 150. In one example, the display region 150 may be a substantially flat region on the top surface 102 of the device 100. In this regard, the display region may be defined as the region bordered by the corresponding connector region 130, the corresponding function region 140, the second adjustment region 120, an adjacent display region 150, and the sides 106 and 108 of the device 100. The display region 150 may have a height that is substantially equal to the height h of the device 100. In one example, each of the display sub-regions 150 may accept gesture input, such as a tap, swipe, or the like.

Figure 3:
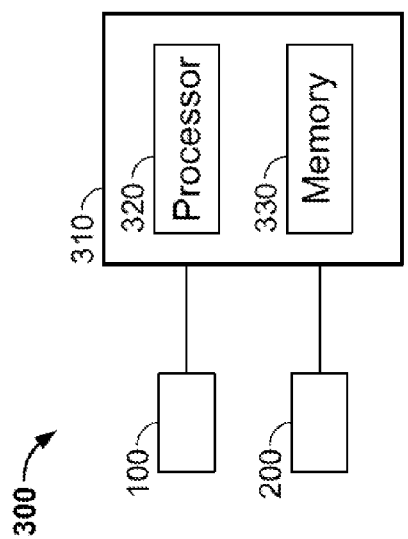
FIG. 3 is a block diagram of a system

FIG. 3 is a block diagram of a system 300 according to aspects of the disclosure. As shown in FIG. 3, a system 300 in accordance with one aspect of the disclosure includes a computer 310 containing a processor 320, memory 330 and other components typically present in general purpose computers. In this example, the input device 100 may be communicatively coupled to the computer 300. In addition, a display device 200 may be communicatively coupled to the processor 300. In one example, the input device 100 and the display device 200 may be physically and/or communicatively coupled to one another.

The memory 330 may store information accessible by processor 320, including instructions that may be executed by the processor 120 and data. The memory 330 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. The system and method may include different combinations of the foregoing, whereby different portions of the instructions and data are stored on different types of media.

The instructions may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

Data may be retrieved, stored or modified by processor 320 in accordance with the instructions. For instance, although the system and method is not limited by any particular data structure, the data may be stored in computer registers, in a relational database as a table having a plurality of different fields and records, XML documents or flat files. The data may also be formatted in any computer-readable format such as, but not limited to, binary values or Unicode. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 320 may be any conventional processor, such as commercially available CPUS. Alternatively, the processor may be a dedicated controller such as an ASIC or other hardware-based processor. Although FIG. 1 functionally illustrates the processor and memory as being within the same block, it will be understood by those of ordinary skill in the art that the processor and memory may actually comprise multiple processors and memories that may or may not be stored within the same physical housing. Accordingly, references to a processor or computer will be understood to include references to a collection of processors or computers or memories that may or may not operate in parallel.

The computer 310 may be at one node of a network and capable of directly and indirectly communicating with other nodes of the network. The network, and intervening nodes between computer 110 and other devices, may comprise various configurations and use various protocols including the Internet, World Wide Web, intranets, virtual private networks, local Ethernet networks, private networks using communication protocols proprietary to one or more companies, cellular and wireless networks (e.g., WiFi), instant messaging, HTTP and SMTP, and various combinations of the foregoing. Although only a few computers are depicted in FIGS. 1-2, it should be appreciated that a typical system can include a large number of connected computers.

According to one implementation, the elements of the system 300 may be carried onboard a vehicle, such as an autonomous vehicle. In this regard, the input device 100 and display device 200 may be positioned in the cabin of the vehicle, such as at a center console. In the same way, the computer 310, including the processor 320 and the memory 330, may be stored at any location aboard the vehicle, and may be responsible for performing other tasks related to vehicle management.

Figure 4:
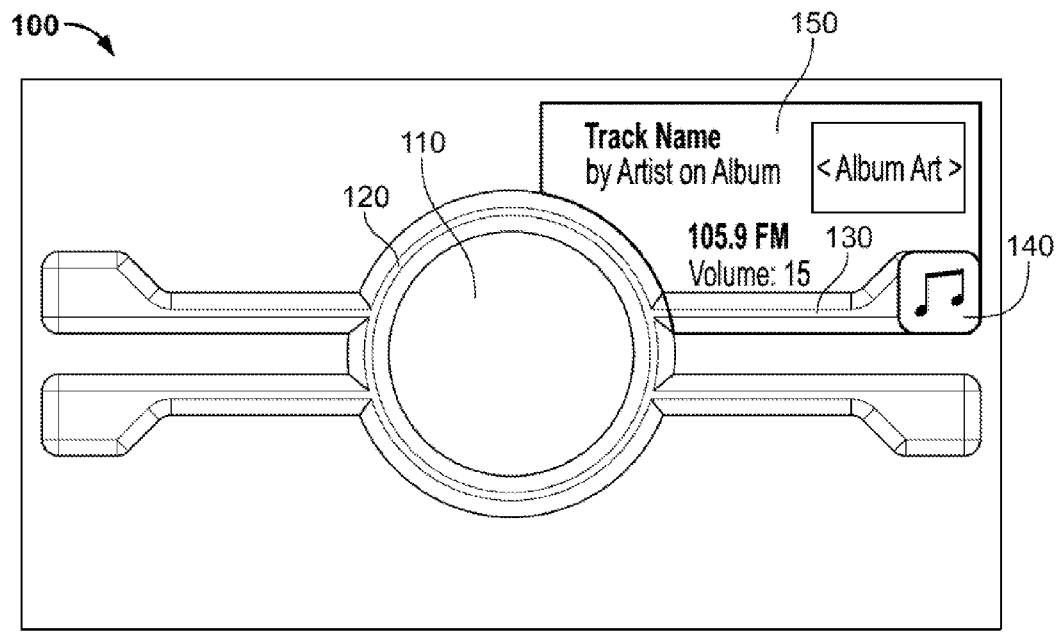
FIG. 4 is top view of a device for receiving input according to a another aspect of the disclosure.

FIG. 4 is a top view an input device 100 in conjunction with a display device 200. The display device 200 may be positioned adjacent the input device 100. By way of example, the display device 200 may positioned adjacent the input device 100 while including one or more layers or elements between display device 200 and the input device 100. In one example, the input device 100 may be overlaid atop and/or secured to the display device 200 and the input device 100 may be clear or substantially transparent, i.e., while the input device 100 may absorb or alter light waves to some extent, the input device 100 is transparent enough to allow the graphics on the display to be distinctly seen by the user. For instance, the bottom surface 104 of the input device 100 may be secured to the display device 200 by any securing method, such as gluing, bonding, press-fit, or the like. The display device 200 may be any type of display, such as an LCD, plasma, LED-LCD, etc. In this regard, the surfaces of the input device 100 may be disposed at distances from the display device 200 corresponding to the heights h, h1, and h2 described above. In one example, the display device 200 may be a projector and may project an image onto one or more surfaces of the display device. The display device 200 may display any combination of graphics or text that may be viewed by a user through the substantially transparent input device 100. Additionally, the display device 200 may be aligned with the device 100 such that the graphics or text displayed by the display device 200 may be visible at one or more regions 110-150 of the device 100.

As shown in FIG. 4, the display device 200 may display any combination of graphics or text and may be visible when viewed from the top surface 102. In this example, certain parameters relating to the audio function may be displayed at one of the display regions 150. In other examples, the display region 150 may be divided into a plurality of sub-regions, and displayed information may relate to other functions, such as the operation of an autonomous vehicle, or any subcomponents thereof, climate control function, or navigation function. In this regard, the system 300 provides a reconfigurable user interface. For example, each of four different functions may be displayed simultaneously at each of four display sub-regions 150 and may be accessible. The different portions of the display device 200 may be used to display different graphical elements corresponding to the surface above it or the desired functions. The visual information shown by the display device 200 may correspond or not correspond with the different surfaces of the input device depending upon the needs of the system or selection of the user. For example, the portion of the display below one display sub-region 150 may correspond with the one feature whereas the portion below another display sub-region 150 may correspond with a different feature.

In the example where the input device 100 includes four display sub-regions, each of the four display sub-regions may correspond to a particular zone inside the cabin of a motor vehicle. For example, in the context of climate control, a user may view climate parameters for a driver at one display sub region, while the climate parameters for the front and rear passenger zones may each be accessible at one of the remaining display sub-regions.

As also shown in FIG. 4, an icon may be displayed by the display device 200 at the function region 140. In this example, the icon may take the form of a music note, indicating that it is associated with the audio function. Other icons and information helating to the various functions may also be displayed.

In operation, a user may view the one or more display regions 150 to see parameters associated with a particular function, such as any of the functions described above. Taking the audio function as an example, parameters relating to the audio function may be displayed at a display region 150. Such parameters parameters may include, for example, track name, artist, album art, radio station information such as modulation (e.g., AM/FM, etc.) or broadcast frequency (e.g., 105.1 mHz), or volume. A user may wish to access the audio function in order to change one or more of the parameters associated with the audio function. Such changes may include, for example, adjusting the modulation (switch AM to FM, or vice versa), adjusting the broadcast frequency to a different radio station (105.1 mHz to 101.9 mHz), or increasing or decreasing the volume. In this scenario, a user may access the function at the function region 140 and subsequently adjust the parameters at one or both of the first and second adjustment regions 110 or 120, as will be explained below.

Figure 5:
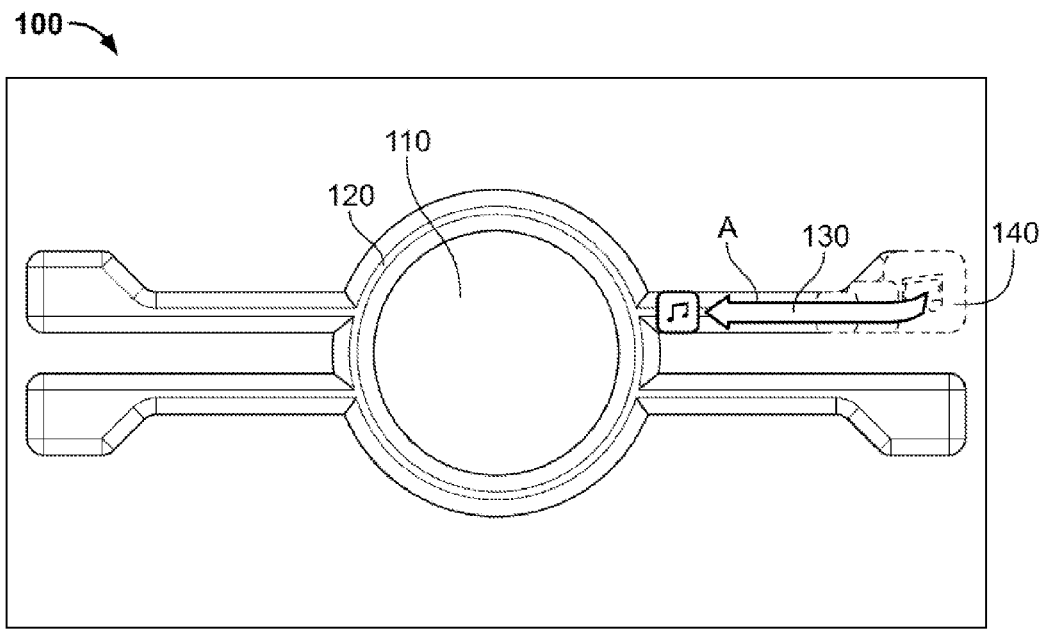
FIG. 5 is top view of a device for receiving input of FIG. 4.
Figure 6:
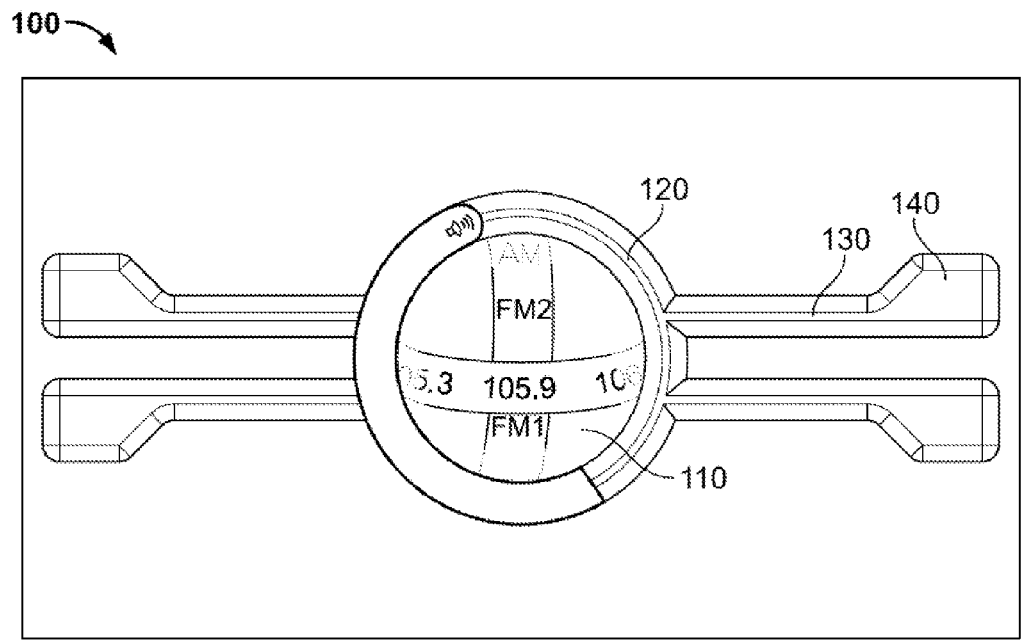
FIG. 6 is top view of a device for receiving input of FIG. 4.
Figure 7:
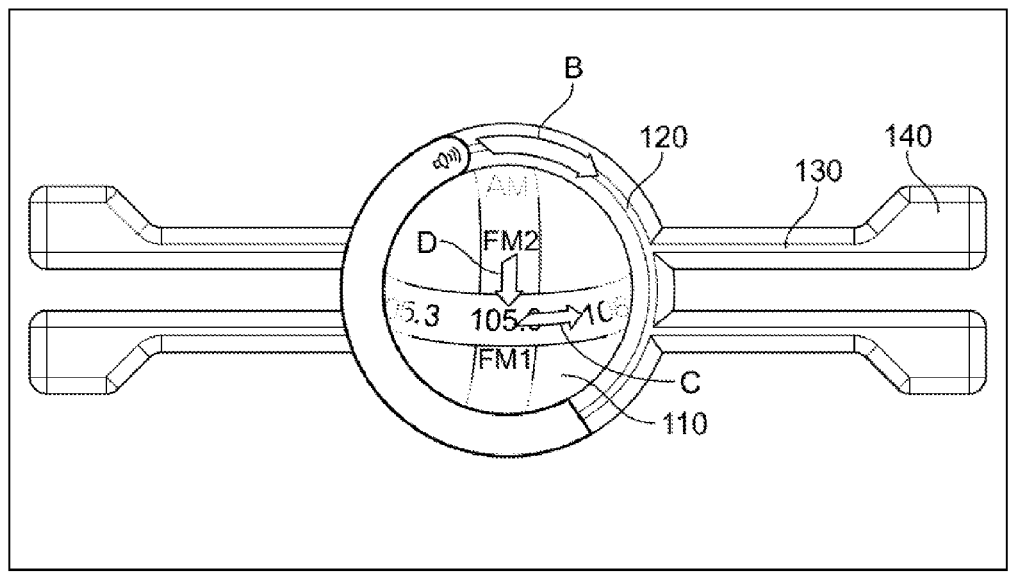
FIG. 7 is top view of a device for receiving input of FIG. 4.

As noted above, a user may input commands, etc. using various gestures. In one example, shown in FIG. 5, a user may provide a continuous gesture from the function region 140 to the connector region 130, as shown by the arrow A. The continuous gesture may be, for example, a swipe extending from the function region 140 to a portion of the connector region 130 adjacent the second adjustment region 120. The gesture may be provided to the input surface 145 and the input surface 134. During this gesture, the icon displayed by the display device 200 and visible in the function region 140 may track the input gesture in the connector region 130 as the gesture is inputted therethrough. Once the gesture has reached a predetermined position within the connector channel 130, certain parameters may be displayed and are accessible at the first and second adjustment regions 110-120. In this regard, a user may access and adjust the parameters associated with the function region at either of the first adjustment region 110 or second adjustment region 120. For example, a user may change the volume by delivering an input to the second adjustment region 120 in the form of a circular swipe, as shown by the arrow B. In this way, a clockwise swipe may yield an increase in volume, while a counter-clockwise swipe may decrease the volume. In one example, a single-finger circular swipe may be differentiated from a multi-fingered circular swipe by the system 300. In this regard, a multi-fingered swipe entered at the second adjustment region 120 may be processed as a different command or operation than a single-fingered swipe at the second adjustment region 120. A user may also adjust audio settings via the first adjustment region 110. In this way, a horizontal swipe, as shown by arrow C, may allow a user to adjust broadcast frequency in order to change radio stations, while a vertical swipe, as shown by arrow D, may change between AM/FM, etc.

If no user input is received at the first or second adjustment regions 110, 120 for a predetermined amount of time, the system 300 may return to a home state. In the home state, a user may not access the parameters at the first or second adjustment regions 110, 120, and may have to provide additional input to the connector region and/or function region in order to access the desired parameters. In another example, a user may provide a gesture input to the connector region in order to return to the home state. In yet another example, a user may provide gesture input to a second connector region. In this regard, the first parameters displayed at the first and second adjustment regions 110 and 120 may be replaced with parameters associated with the second connector region.

In one example, the input device 100 may accommodate access to more than four functions. In this example, the input device 100 may include a function selector region. The function selector region may be disposed at a periphery of the input device 100 near one of the sides 106 or 108. The function selector region may extend longitudinally between two opposing sides, e.g., sides 106 and 108. The function selector region may include an input surface to that of the connector region 130 and may similarly be recessed within the input device 100. In operation, a user may deliver gesture input to the function selector region in the form of a swipe. The gesture input may cause different functions to be displayed at the display sub-regions 150, allowing a user to access different functions.

According to another implementation, the input device 100 may include one or more movable surfaces or regions. For example, the input device 100 may include one or more buttons that may be pressed by a user. In one example, the first adjustment region 110 may be movable from a first position to a second position in a direction perpendicular to the top and bottom surfaces 102 and 104. In this example, a user may modify any of the settings or parameters associated with a particular function by pressing or pulling the first adjustment region 110 to and/or from the first and second positions. In another example, such button may toggle power as an on/off switch.

According to another implementation, the first adjustment region 110, the second adjustment region 120, the connector region 130, and the function region 140 are all co-planar with respect to the top surface 102. In this regard, each of the regions 110-140 have a height h. In this implementation, each of the regions 110-140 may have other characteristics which may allow for tactile distinction among the regions 110-140. For example, certain regions may be formed of a plastic while other regions may be formed of a glass. In this example, the plastic and the glass may have different surface textures, allowing a user to differentiate different regions by virtue of the different textures. In another example, one or more overlays may be placed atop the top surface 102, with each of the overlays corresponding to a particular region. In this example, the each of the overlays may have a different texture, allowing a user to differentiate the regions. The overlays may be, for example, a stencil that is glued or otherwise bonded to the top surface 102. In another example, the overlays may be bonded directly to the display device.

In another implementation, the input device 100 may detect a user's input by methods other than the touch sensing methods described above. For example, a multi-camera array may detect the movements of a user's hand. In this regard, the device 100 may not be touch sensitive. Instead, the multi-camera array may detect and distinguish the movements of a user's hand among the various regions of the device 100. In one alternative, multiple cameras, stereo vision, or other 3D imaging technologies, such as structured light emission, may be used to detect user input. In yet another implementation, an array of infrared (IR) emitters may be arranged at the periphery of the device 100, e.g, near the sides 106 and 108. In this example, the IR emitters may detect and distinguish the movements of a user's hand among the various regions of the device 100.

It will be further understood that the sample values, types and configurations of data shown in the figures are for the purposes of illustration only. In that regard, systems and methods in accordance with the present invention may include different data values, types and configurations, and may be provided and received at different times (e.g., via different web pages) and by different entities (e.g., some values may be pre-suggested or provided from different sources).

As these and other variations and combinations of the features discussed above can be utilized without departing from the invention as defined by the claims, the foregoing description of the embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

The invention claimed is:

1. A system, comprising:
a user input device comprising:
 a first input surface configured to receive user input, the first input surface disposed on a first side of the user input device;
 a second input surface configured to receive user input, the second input surface disposed on the first side of the user input device; and
 a display device disposed adjacent a second side of the user input device, the display device being disposed at a fixed first distance from the first input surface and at a fixed second distance from the second input surface, with the first distance being different from the second distance; and
 a display surface disposed on the first side of the user input device, configured to display a graphic, the display surface being entirely disposed a fixed third distance from the display device, the third distance being between the first and second distance.

2. The system of claim 1, wherein the user input device is translucent.

3. The system of claim 1, the user input device further comprising a third input surface configured to receive user input, the third input surface disposed on the first side of the user input device and being disposed at a distance from the display device equal to the second distance.

4. The system of claim 3, wherein the third input surface further comprises a plurality of third input surfaces.

5. The system of claim 1, wherein the first input surface is circular.

6. The system of claim 5, wherein the first input surface is convex with respect to the second side.

7. The system of claim 5, wherein the first input surface is configured to receive at least one of a horizontal swipe, vertical swipe and tap.

8. The system of claim 1, wherein the second input is a circular ring.

9. The system of claim 8, wherein the second input surface surrounds the first input surface.

10. The system of claim 8, wherein the second input is recessed with respect to the first side of the user input device.

11. A user input device having a first side and a second side, comprising:
    a first input surface configured to receive user input, the first input surface disposed on the first side and having a fixed first height with respect to the second side;
    a second input surface configured to receive user input, the second input surface disposed on the first side of the user input device and having a fixed second height with respect to the second side;
    a display surface disposed on the first side of the user input device configured to display a graphic, the display surface entirely disposed at a fixed third height with respect to the second side that is less than the first height and greater than the second height.

12. The user input device of claim 11, further comprising a third input surface configured to receive a third user input, the third input surface disposed on the first side of the user input device and having a fourth height with respect to the second side that is equal to the second input surface.

13. The user input device of claim 12, wherein the third input surface further comprises a plurality of third input surfaces.

14. The user input device of claim 11, wherein the first input surface is circular.

15. The user input device of claim 14, wherein the first input surface is convex with respect to the second side.

16. The user input device of claim 14, wherein the first input surface is configured to receive a horizontal swipe, vertical swipe or tap.

17. The user input device of claim 11, wherein the second input is a circular ring.

18. The user input device of claim 17, wherein the second input surface surrounds the first input surface.

19. The user input device of claim 17, wherein the second input is recessed with respect to the first side of the input device.

20. A method of receiving input, comprising:
    receiving a first user input at a first input surface, the first input surface being disposed on a first side of a user input device and having a fixed first height with respect to a second side of the user input device;
    receiving a second user input at a second input surface, the second user input being disposed on the first side of the user input device and having a fixed second height with respect to the second side of the user input device, the second height being less than the first height; and
    displaying, on a display surface disposed on the first side of the user input device, a graphic;
    wherein the display surface is entirely disposed at a fixed third height with respect to the second side that is less than the first height and greater than the second height.

21. The method of claim 20, wherein the first user input comprises at least one of a horizontal swipe, a vertical swipe, or a tap.

22. The method of claim 20, wherein the second user input comprises a circular swipe.

23. A system comprising:
    a display;
    a translucent input device overlaying the display;
    the input device comprising a surface and an output, the output providing signals indicative of a location at which the surface was touched and the surface comprising:
    a first touch sensitive portion disposed a fixed first distance from the display,
    a second touch sensitive portion disposed a fixed second distance from the display, the second distance being farther from the display than the first touch sensitive portion, and
    a transition portion disposed between the first touch sensitive portion and the second touch sensitive portion, the transition portion being configured to be perceptibly distinguishable, based on human touch, from the first and second touch sensitive portions; and
    a display surface configured to display a graphic, the display surface entirely disposed a fixed third distance from the display, the third distance being shorter than the second distance and greater than the first distance.

24. The system of claim 23, further comprising a processor, a memory accessible by the processor and instructions stored in the memory and accessible by the processor, wherein the instructions include: displaying on the display a first visual feature corresponding with a first function at a location corresponding with the first touch sensitive portion, displaying on the display a second visual feature corresponding with a different function at a location corresponding with the second touch sensitive portion, and performing the first function when the output indicates that the first touch sensitive portion was touched and the second function when the output indicates that the second touch sensitive portion was touched.

25. The system of claim 23, wherein a shape of the transition portion relative to the plane is a curve.

26. The system of claim 25, wherein the shape is a circle.

27. The system of claim 23, wherein a cross section of a transition portion, relative to a plane orthogonal to the plane of display edges, is at least partially curved.

28. The system of claim 23, wherein the input device is configured to output data indicative of a swipe gesture, wherein the first touch sensitive portion is configured to receive a swipe gesture without touching the second touch sensitive portion, and wherein the second touch sensitive portion is configured to receive a swipe gesture without touching the first touch sensitive portion.

29. The system of claim 23 wherein the transition portion is touch sensitive and the output indicates when the transition portion was touched.

* * * * *